United States Patent [19]

Borreson

[11] 4,083,313
[45] Apr. 11, 1978

[54] AUTO DRIVER'S VALET WITH TRASH BAG

[76] Inventor: Edgar L. Borreson, 6133 N. Newburg Ave., Chicago, Ill. 60631

[21] Appl. No.: 632,865

[22] Filed: Nov. 17, 1975

[51] Int. Cl.² .............................................. A47B 85/00
[52] U.S. Cl. ................................................... 108/26
[58] Field of Search .................. 108/26, 33, 92, 50; 248/99, 98, 100; 224/42.42 A; 312/235 A, 135 A; 211/128

[56] References Cited

U.S. PATENT DOCUMENTS

| 2,587,302 | 2/1952 | Fawcett | 312/235 A |
| 2,822,968 | 2/1958 | Jackson | 224/42.42 A |
| 2,934,391 | 8/1960 | Bohnett | 312/235 A |
| 3,061,394 | 10/1962 | Whetstone | 312/235 A |
| 3,304,143 | 2/1967 | Connell | 297/194 X |
| 3,326,446 | 6/1967 | Goings | 312/235 A |
| 3,517,978 | 6/1970 | Hudson | 297/194 X |
| 3,526,314 | 9/1970 | Trammell, Jr. | 224/42.42 A |
| 3,632,029 | 1/1972 | Sonner | 224/42.42 A |
| 3,909,092 | 9/1975 | Kiernan | 312/235 A |

FOREIGN PATENT DOCUMENTS

| 114,185 | 6/1969 | Denmark | 248/99 |

Primary Examiner—James T. McCall

[57] ABSTRACT

A wooden constructed two level car tray for miscellaneous uses.

1 Claim, 4 Drawing Figures

AUTO DRIVER'S VALET WITH TRASH BAG

BACKGROUND OF THE INVENTION

This invention relates to a two level car tray for four door passenger cars, and by being of a portable type it could be used in some two door cars. The tray is so constructed to set firmly in place in the front seat between the driver and the passenger.

The object of this invention is to provide a space for a standard typewriter size writing pad for the front level and in another space for a junior size or regular size tissue box. It would serve as a very convenient table to write notes, eating and drinking while sitting in the car.

And an additional feature is a trash bag with a slip-on sheet metal attachment.

And still another feature is that the trash bag may be removed and replaced on the original wire frame.

Figure 1:
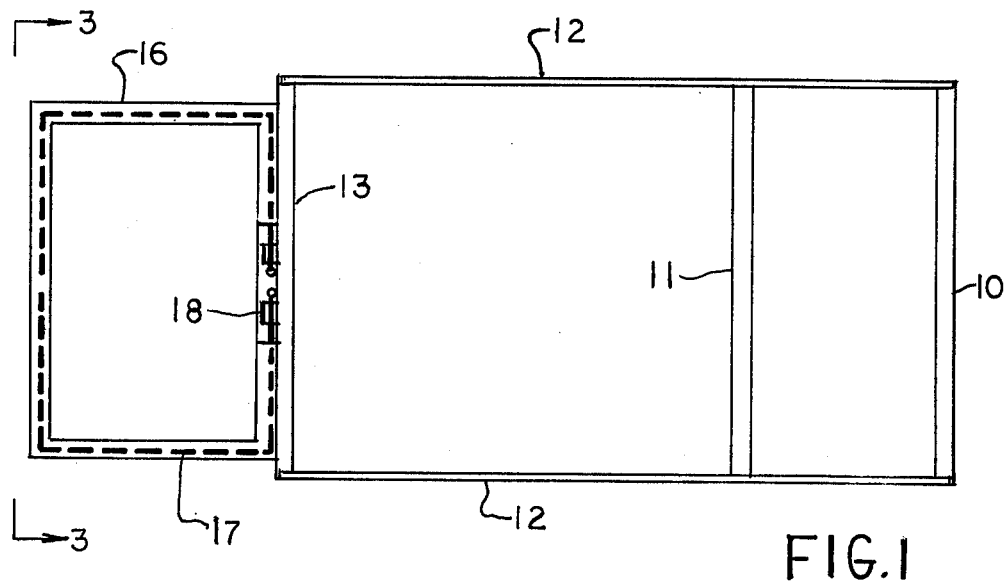
FIG. 1 is a plan view of the auto driver's valet.

Further objects and advantages of this invention will appear more clearly from the drawings and descriptive analysis of its make-up.

DESCRIPTION OF CONSTRUCTION DETAIL

The assembly drawing has 7 embodying features that will be illustrated of this invention.

This invention consists of two major parts, a utility tray and the trash bag supported by a vehicle passenger seat. The trays two ends 10 & 13 and partition 11 are constructed of one half inch lumber, while the two sides 12 are constructed of one quarter inch plywood. All pieces are slotted to fit one eight inch masonite terraced shelves 14 & 15 to form a tight, solid and fairly sound proof bottom. The two sides 12 are cut on a curve to fit the vehicle seats snugly, while it holds firmly in place, and still being of a portable type of tray. All parts are held together with six penny finishing nails 20.

Figure 3:
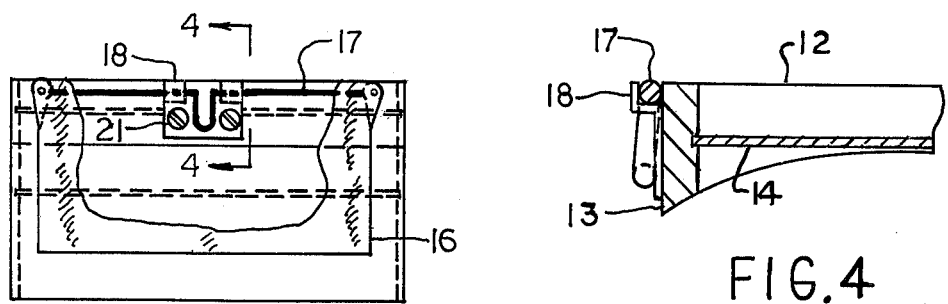
FIG. 3 is an end view of the auto driver's valet.

The trash bag 16 is constructed of denium cloth with a sewn peripherial hem 19 at the top of the bag. Back of the sewn hem 19 will be slotted from top down in two places as in FIG. 1, to permit threading the bag on heavy wire 17 bent to fit the size of bag and to expose a downwardly extending U-shaped portion of wire or bar 17 as shown in FIG. 3, so as to hold bag in horizontal position when hung on trash bag bracket 18, which is held in place with two screws 21. Said bracket having at least two upwardly extending hook members.

Figure 2:
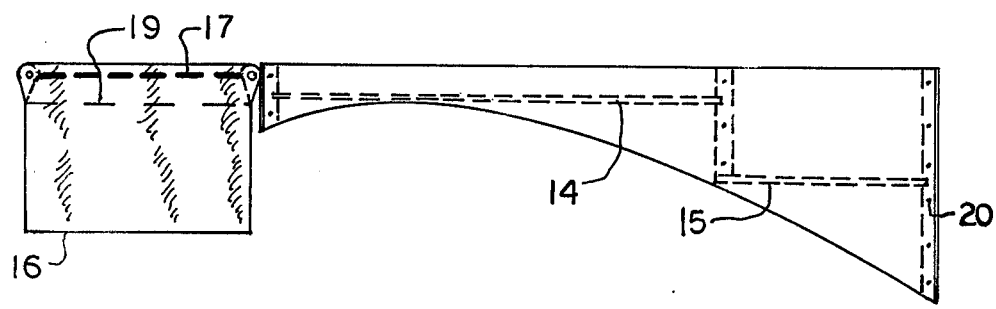
FIG. 2 is a side view of the auto driver's valet.

The utility tray as seen in FIGS. 1 and 2 has two terraced shelf members 14 and 15 embraced by vertically disposed front, rear and side walls members 13, 10 and 12, respectively.

Figure 4:
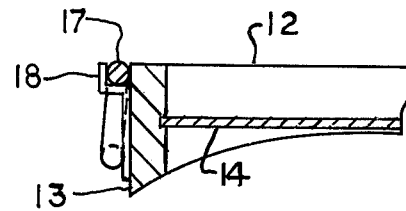
FIG. 4 is a section showing the trash bag bracket and U-bend wire frame.

As shown in FIG. 3, the wire or bar member 17 has a downwardly extending stabilizing bight portion (not numbered) for engaging the front wall of the unit as best shown in FIG. 4.

As shown in FIGS. 1, 2 and 4, the utility tray has an open to which provides continuous access to the interior of said tray.

It must be conceived that the utility tray can be made in plastic material as well, and by attaching bracket 18 thereto, and the trash bag may also be made of a soft plastic material.

It is obvious that minor changes can be made without departing from the concept of this invention and all such that fall within the reasonable scope of appended claims are claimed.

What is claimed is:

1. A combined utility tray unit and trash bag adapted to be supported by a vehicle passenger seat, said tray comprising two terraced shelf members embraced by vertically disposed front, rear and side wall members, two of said side wall members having arcuate lower edges so as to conform with the curvature of the upper surface of a vehicle passenger seat, said front wall member having mounted thereon a bracket including a pair of upwardly extending hook members, a trash bag having a peripheral hem inserted supporting bar at the upper portion of said bag, a portion of the hem being open so as to expose a hook engaging portion of said supporting bar for engaging hook members on said bracket, the exposed portion of said bar having a downwardly extending stabilizing bight portion for engaging said front wall of the unit, said terraced dhelf members being continuously accessible from the open upper portion of said tray unit.

* * * * *